United States Patent
Muschett et al.

(10) Patent No.: US 11,687,796 B2
(45) Date of Patent: Jun. 27, 2023

(54) DOCUMENT TYPE-SPECIFIC QUALITY MODEL

(71) Applicant: International Business Machines Corporation, Armonk, NY (US)

(72) Inventors: Brien H. Muschett, Palm Beach Gardens, FL (US); Andrew R. Freed, Cary, NC (US); Roberto Delima, Apex, NC (US); David Contreras, Willow Spring, NC (US); Krishna Mahajan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 16/386,652

(22) Filed: Apr. 17, 2019

(65) Prior Publication Data

US 2020/0334546 A1    Oct. 22, 2020

(51) Int. Cl.
| | |
|---|---|
| *G06F 17/00* | (2019.01) |
| *G06N 5/022* | (2023.01) |
| *G06F 16/93* | (2019.01) |
| *G06N 20/00* | (2019.01) |
| *G06F 16/908* | (2019.01) |

(Continued)

(52) U.S. Cl.
CPC ........... *G06N 5/022* (2013.01); *G06F 16/908* (2019.01); *G06F 16/93* (2019.01); *G06F 40/284* (2020.01); *G06F 40/289* (2020.01); *G06F 40/30* (2020.01); *G06N 5/025* (2013.01); *G06N 20/00* (2019.01)

(58) Field of Classification Search
CPC ........ G06N 5/022; G06N 5/025; G06N 20/00; G06F 16/908; G06F 16/93; G06F 40/284; G06F 40/289; G06F 40/30; G06F 16/353
See application file for complete search history.

(56) References Cited

U.S. PATENT DOCUMENTS

| | | |
|---|---|---|
| 8,442,813 B1 | 5/2013 | Popat |
| 9,141,607 B1 | 9/2015 | Lee et al. |

(Continued)

FOREIGN PATENT DOCUMENTS

| | | |
|---|---|---|
| EP | 1503338 | 7/2012 |
| EP | 1503341 | 7/2012 |
| EP | 2669847 | 11/2017 |

OTHER PUBLICATIONS

Sánchez, David, and Antonio Moreno. "Learning non-taxonomic relationships from web documents for domain ontology construction." Data & Knowledge Engineering 64.3 (2008): 600-623 (Year: 2008).*

(Continued)

*Primary Examiner* — Andrew T McIntosh
(74) *Attorney, Agent, or Firm* — VanLeeuwen & VanLeeuwen; Jared C. Chaney

(57) ABSTRACT

An approach is provided that receives a document and a document type of the document. The document type identifies a document category to which the received document belongs. A set of linguistic metrics are retrieved that correspond to the document type. A quality of the received document is automatically determined based on a set of linguistic features found in the document as compared to the retrieved set of linguistic metrics. The document is then ingested into a corpus that is utilized by a question-answering (QA) system. The ingestion of the document is based on the determined quality.

17 Claims, 6 Drawing Sheets

(51) Int. Cl.
*G06F 40/30* (2020.01)
*G06F 40/284* (2020.01)
*G06F 40/289* (2020.01)
*G06N 5/025* (2023.01)

(56) References Cited

U.S. PATENT DOCUMENTS

| | | | |
|---|---|---|---|
| 9,317,764 | B2 | 4/2016 | Baheti et al. |
| 9,773,166 | B1* | 9/2017 | Connor ................. G06N 20/00 |
| 10,467,252 | B1* | 11/2019 | Barsony ............... G06F 16/285 |
| 2002/0103834 | A1 | 8/2002 | Thompson et al. |
| 2006/0095841 | A1* | 5/2006 | Oikawa ................. G06F 16/93 |
| | | | 715/205 |
| 2014/0358928 | A1* | 12/2014 | Alkov .................. G06N 20/00 |
| | | | 707/738 |
| 2015/0347467 | A1* | 12/2015 | Basson ................. G06F 16/93 |
| | | | 707/769 |
| 2016/0026634 | A1* | 1/2016 | Allen .................... G06F 40/20 |
| | | | 707/740 |
| 2017/0329754 | A1* | 11/2017 | Beller ................. G06F 16/313 |
| 2018/0011974 | A1 | 1/2018 | Schneider et al. |
| 2020/0142998 | A1* | 5/2020 | Contreras ............. G06N 5/003 |

OTHER PUBLICATIONS

Schäfer, Roland, Adrien Barbaresi, and Felix Bildhauer. "The good, the bad, and the hazy: Design decisions in web corpus construction." 8th Web as Corpus Workshop. 2013 (Year: 2013).*

Rydberg-Cox, Jeffrey A., Anne Mahoney, and Gregory R. Crane. "Document quality indicators and corpus editions." Proceedings of the 1st ACM/IEEE-CS joint conference on Digital libraries. 2001 (Year: 2001).*

Cannon et al., "Quality Assessment and Restoration of Typewritten Document Images," Los Alamos National Laboratory, International Journal on Document Analysis and Recognition, vol. 2, Issue 2-3, Nov. 1998, 24 pages.

* cited by examiner

DOCUMENT TYPE-SPECIFIC QUALITY MODEL

BACKGROUND

Question-answering (QA) systems ingest large quantities of documents to form a knowledge base, or corpus, related to a particular field, referred to as a "domain." During the capturing of documents and the ingesting of document details, typically ingested as "passages," the quality of the document being ingested is often ascertained. Quality assurance of a document is traditionally accomplished by using a generic document quality model that assumes that all of the documents being captured and ingested are homogeneous. Traditional approaches typically gather metrics around criteria such as the number of valid words in the document, the average sentence length of sentences in the document, etc. However, thresholds that indicate a quality document differ from one field to another. For example, a financial document memo that contains short concise sentences and informal language may be a quality financial memo type of document, but treating such a document with a generic model in a traditional approach might very well deem the document of poor quality because short sentences and informal language is often deemed, in a generic sense, to indicate a poorer quality document. As a result, in traditional QA document ingestion systems, high quality documents might unfortunately be avoided or scored lower than other documents because of the way they are evaluated using a generic document model.

SUMMARY

An approach is provided that receives a document and a document type of the document (e.g., a business letter, a poem, an essay, a legal document, a promissory note, a medical record, a scientific article, a newspaper article, a technical article, a thesis paper, a journal article, a blog entry, a financial memo, a resume, a patent application, and a post to a social media site, etc.). The document type identifies a document category to which the received document belongs. A set of linguistic metrics are retrieved that correspond to the document type. A quality of the received document is automatically determined based on a set of linguistic features found in the document as compared to the retrieved set of linguistic metrics. The document is then ingested into a corpus that is utilized by a question-answering (QA) system. The ingestion of the document is based on the determined quality.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
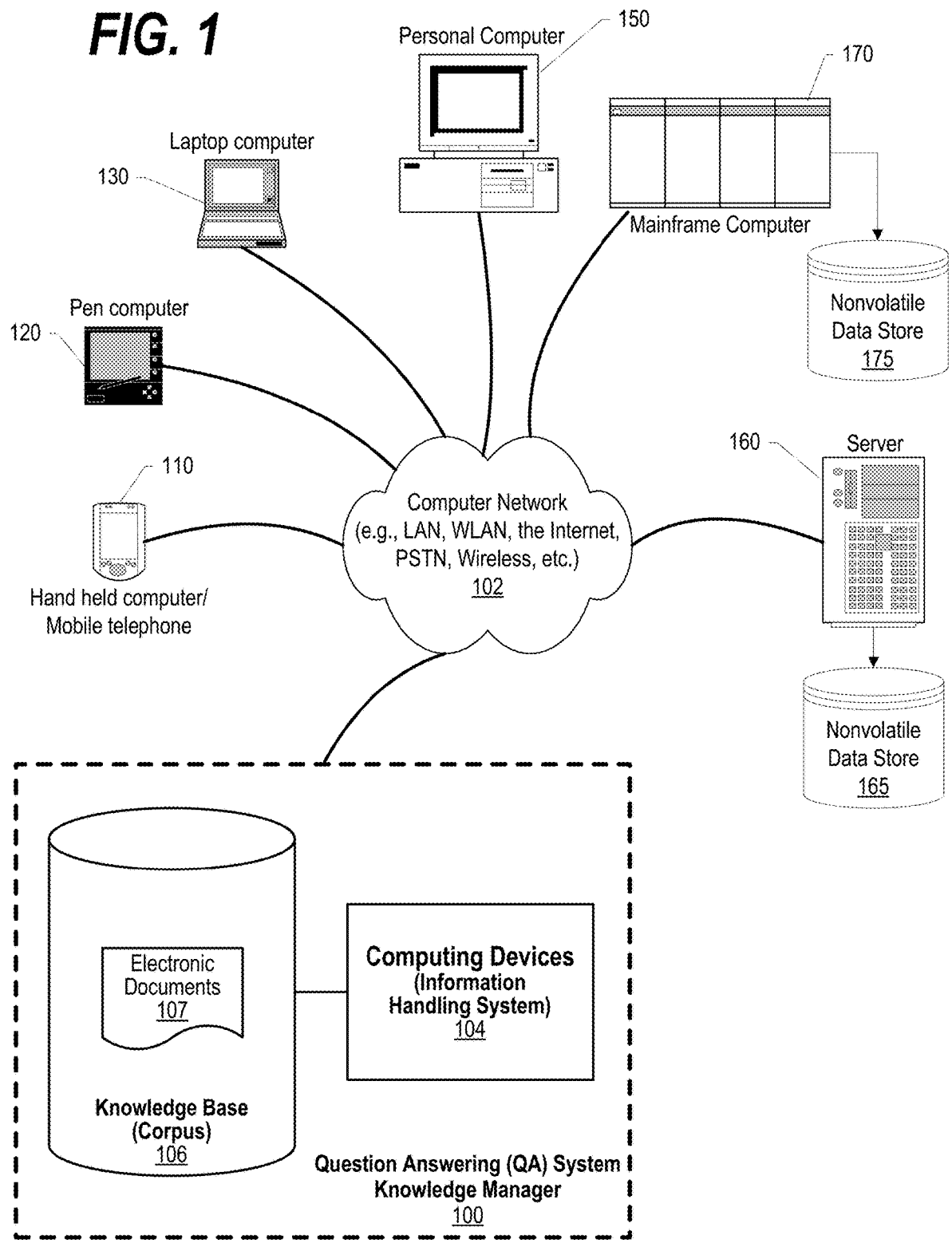
FIG. 1 depicts a network environment that includes a knowledge manager that utilizes a knowledge base.

FIGS. 1-6 describe an approach that determines the quality of a document based on the document type to which the document belongs. Document types can include types such as a business letter, a poem, an essay, a legal document, a promissory note, a medical record, a scientific article, a newspaper article, a technical article, a thesis paper, a journal article, a blog entry, a financial memo, a resume, a patent application, and a post to a social media site, etc.

The approach described herein is useful when analyzing optically scanned documents, such as those ingested into a question-answering (QA) system, where we do not simply want to analyze the text itself but get an understanding of how much the scanning process has potentially corrupted the document text. It is possible to gather metrics around number_valid_words, average_sentence_length, etc which affect document quality from both an natural language processing (NLP) worthiness and a scan-quality perspective. However, traditional approaches do not adapt such metrics for the document type of the document.

For instance, in financial documents a memo contains short sentences and informal language and promissory notes contain lengthy sentences with extremely formal language. A general purpose metric might assign low quality to a given memo due to it having shorter sentences than "typically good" documents, however the memo may be completely in line with typical memos. Thus we want to build not just a generic metric for "is this a good document" but a specific metric of "given the known document type, is this a good document"

Determining a document type specific quality value (important for optical character recognition output and other types of potential lossy document transcoding methods) is a valuable metric especially in deciding whether or not to apply further document analytics. This invention aides in the challenge of answering the question "Does this document meet the digital content and semantic requirements for its document type, such that further downstream NLP/document processors to generate meaningful outputs?"

The approach computes document quality across a variety of known document types using a set of known document quality metrics. For each document type, the approach builds a range of good/bad thresholds for the quality metrics, specific to that document type. When analyzing an instance of a document type, the approach compute its quality metrics and compare the metrics to the thresholds for the specific document type.

The approach identifies document type groups ahead of time and analyze these groups for document quality features. The approach further runs quality analysis on each type/grouping to determine relevant thresholds. Groups can be identified by manual curation/human inspection, metadata from filename/ECM, or clustering of document metric scores.

One application of this approach is determining which documents are suitable for Natural Language Processing (NLP). The process described herein can help find documents that were corrupted by an OCR process. For example, in the financial domain, memos are a good source of knowledge but have different text characteristics than appraisals and promissory notes (namely, shorter sentences). Likewise, in the medical domain, a good clinician's note has different textual qualities than a good pathology report.

Another application of this approach is a document grading system for use in the classroom. For example, a student teacher is grading assignments and uses prior students work to develop quality models. These quality models would be based upon entity richness (how many important keywords/names were used), length of quality sentences (words per sentence), average size of word etc and be generated from those documents previously receiving the letter grade of 'A' (90-100). The teacher would do this for the various types of documents expected in the classroom. For example, an English teacher may require assignments for the following document types as part of the curriculum:

A business letter
An essay in comparison and contrast
A poem

Each one of the document types generates different quality features. Conversely, a generic model such as used by traditional systems, would not best represent all document types. A poem, for example. may contain short sentences but the words in each sentence are long. Applying a quality model generated from business letter instances would not accurately reflect the quality model matching poem instances. A teacher could use this approach to more accurately grade a student's paper by comparing its quality metrics against that of the document type baseline model. An advantage of this approach, over traditional approaches, is that there is a greater degree in accuracy of quality determination than when using a more general set of metrics. The following provide two examples of environments where the approach described herein can be utilized.

EXAMPLE 1

A document quality scheme for financial documents uses features for number of sentences, average sentence length and percentage of words found in a dictionary. Three document types are analyzed: memos, promissory notes, and appraisals.

|  | Number of sentences | Average sentence length | Percentage of dictionary words |
| --- | --- | --- | --- |
| Memo | 50-100 | 10-14 | 99% |
| Promissory Note | 200-300 | 28-35 | 95% |
| Appraisal | 1500-2000 | 17-23 | 99% |
| Overall Average | 600-800 | 18-22 | 97% |

A promissory note with average sentence length of 30 is well over the overall average length, however with our invention it is still shown to be a quality document given its type. A promissory note with average sentence length of 18 is in line with the overall average but it well short of the type-specific quality range, thus it is considered a bad document—it may not be a valid promissory note, or it might have been OCR'd poorly.

EXAMPLE 2

An English teacher assigns the students to write a poem. Students may select a poem type from any of the three categories of poems: Haiku, Limerick or Sonnet. The teacher identifies the distinguishing shared feature set for the types as:

Number of valid words
Length of sentences
Number of sentences
Length of words
Tone The teacher gathers together a representative set of well-known Haiku poems and runs the document quality feature analyzer against it to determine that a good Haiku poem consists of three sentences with roughly four words per sentence and an average of 12 6-letter words. It has an emotional tone of sadness.

The teacher gathers together a representative set of well-known Limerick poems and runs the document quality feature analyzer against it to determine that a good Limerick poem consists of 5 sentences with roughly 7 words per sentence and an average of 34 8-letter words. It has an emotional tone of joyfulness.

Finally, the teacher gathers together a representative set of well-known Sonnet poems and runs the document quality feature analyzer against it to determine that a good Sonnet poem consists of 14 sentences with roughly 8 words per sentence and an average of 98 5-letter words. It has an emotional tone of tentative and conscientious.

When a student submits the assignment, they declare the poem type. The teacher runs the document quality analyzer to produce the features set which is then compared against the "rules model" identifier by the poem type. The teacher can then determine whether the poem is a good instance of the poem type.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
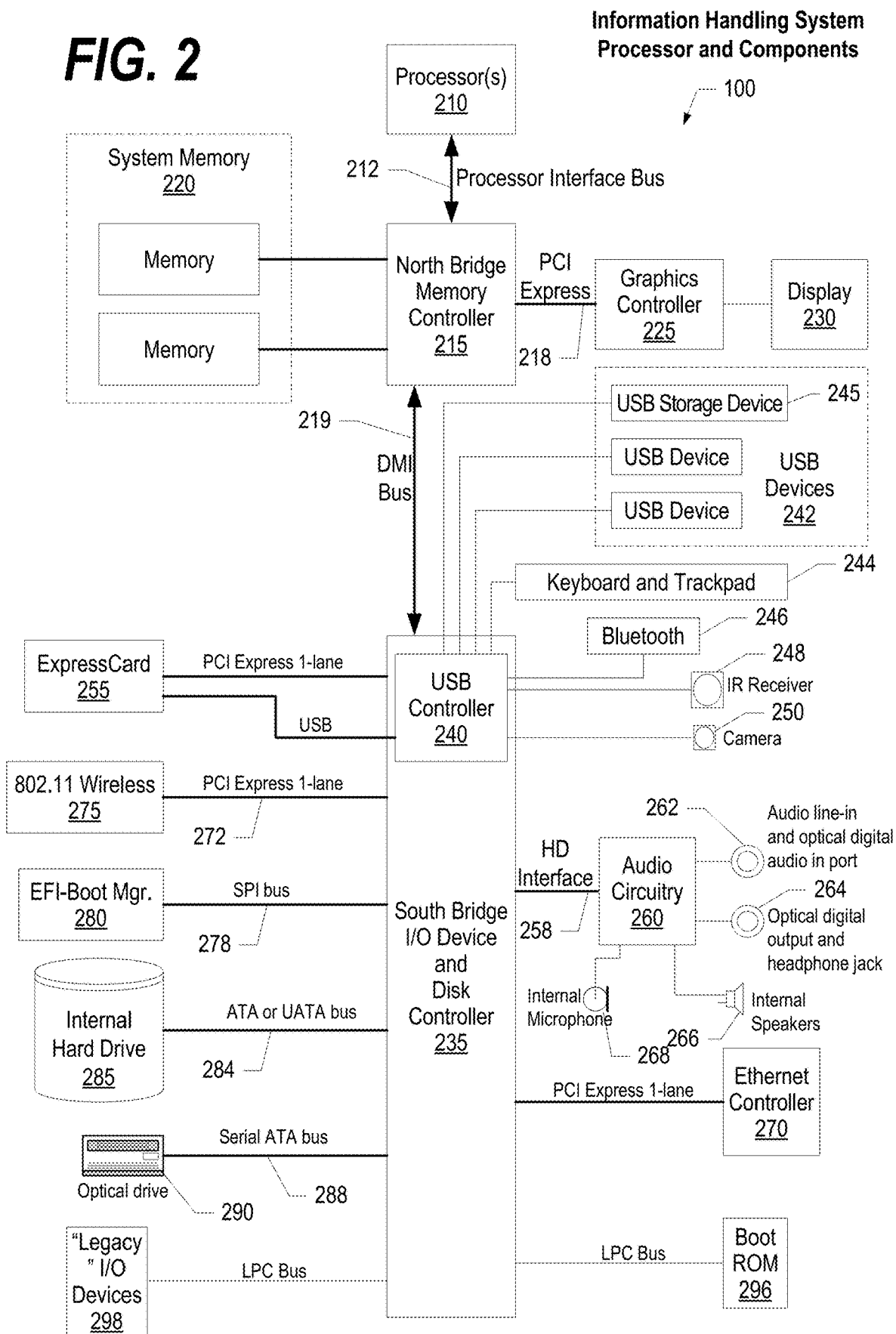
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
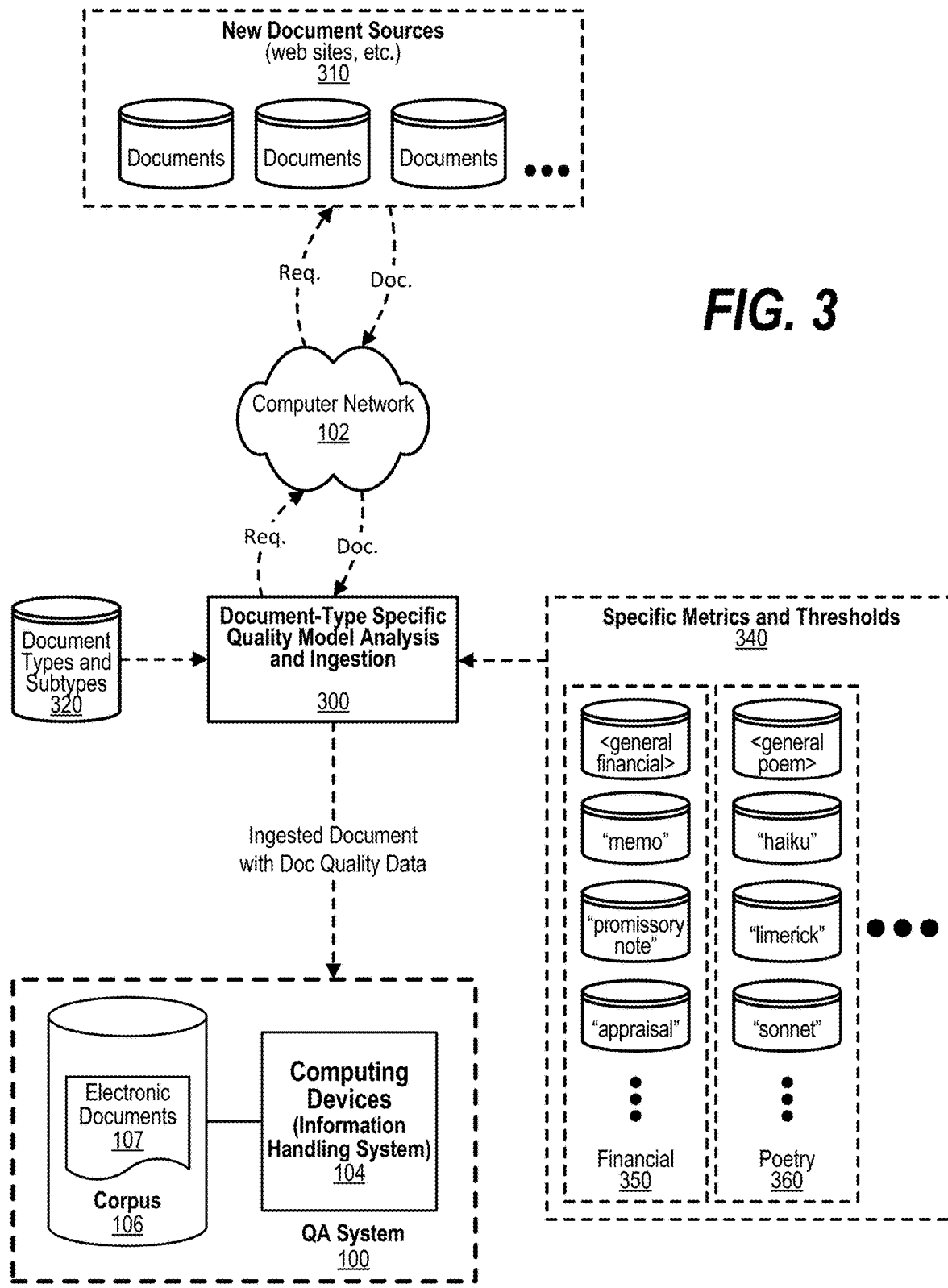
FIG. 3 is a component diagram that shows the various components included in a document type specific quality model analysis and ingestion process.

FIG. 3 is a component diagram that shows the various components included in a document type specific quality model analysis and ingestion process. Process 300 is the Document Type Specific Quality Model Analysis and Ingestion process. Process 300 retrieves documents from document sources 310, such as documents found in network accessible storage areas accessible through computer network 102, such as the Internet.

Document types and subtypes that the system currently supports are stored in data store 320. While a document subtype is included within a document type, as used herein, a document type is also a document type. Each of the document types and subtypes have specific metrics and thresholds that are applied to the type/subtype. These specific metrics and thresholds are stored in data stores 340. Two document types are shown as examples within specific metrics and thresholds 340—financial document type 350 and poetry document type 360. As shown, each of these document types includes many other types (subtypes) within the respective document type. For example, the financial document type includes types of "memo," "promissory note," "appraisal," <general financial>, etc. In one embodiment, the <general financial> is used for financial documents for which a more specific type (subtype) has not been identified with those general financial documents being analyzed using the "overall averages" data from Example 1 that was shown above. Likewise, poetry document type 360 includes types of <general poem>, "haiku," "limerick, "sonnet," etc. Each of these data stores has stored herein the metrics and thresholds used to analyze the noted document type.

Process 300 receives a document from sources 310 and analyzes the document for document quality purposes. Some of the documents received might be documents that have been scanned in using an optical character recognition (OCR) process. Documents are ingested to corpus 106 of QA system 100. In one embodiment, process 300 avoids ingesting documents into the corpus when a quality score of the document fails to reach a certain threshold. In another embodiment, the quality score of a document is ingested to corpus 106 as metadata along with the document contents so that the quality score information can be used by the QA system when evaluating use, or reliance upon, a particular document found in the corpus.

Figure 4:
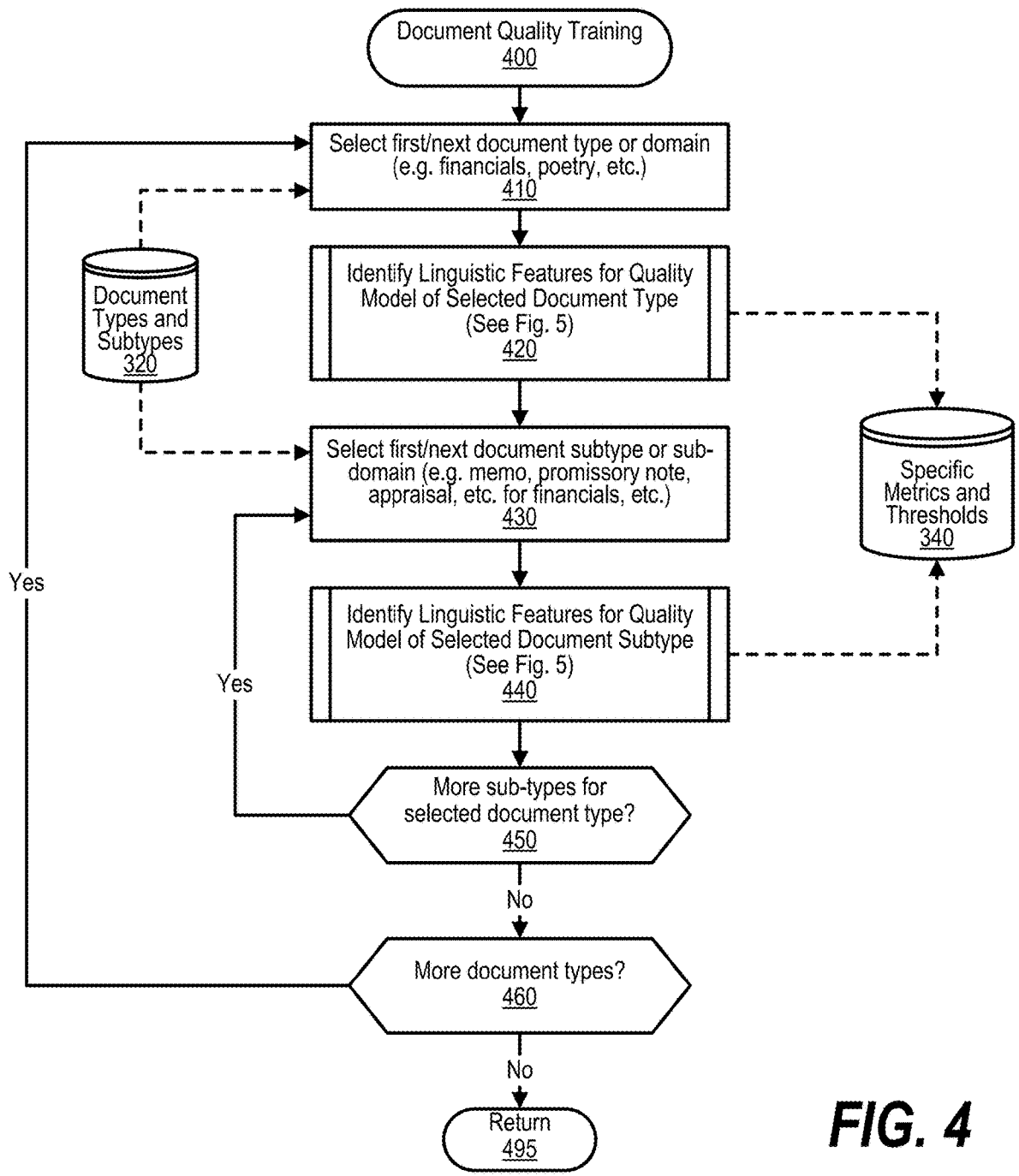
FIG. 4 is a depiction of a flowchart showing the logic used to perform document quality training for type-specific documents.

FIG. 4 is a depiction of a flowchart showing the logic used to perform document quality training for type-specific documents. FIG. 4 processing commences at 400 and shows the steps taken by a process that performs a document quality training process to establish specific metrics and thresholds from documents in a particular domain. At step 410, the process selects the first document type or domain (e.g. financials, poetry, etc.) from data store 320. In one embodiment, the documents selected have been verified as being high quality documents that are quality representatives of the document type (e.g., high quality financial memo, high quality haiku poem, etc.).

Figure 5:
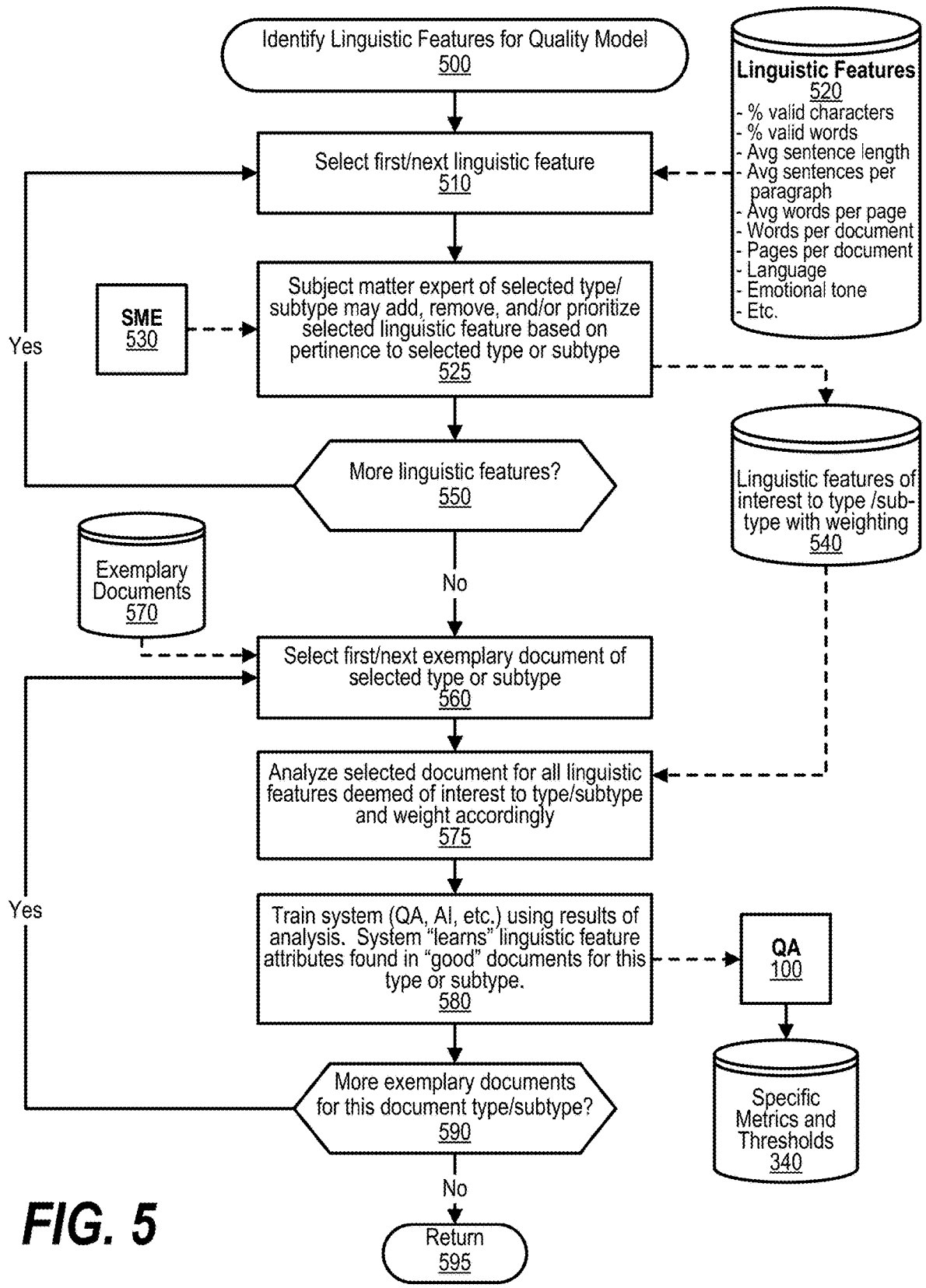
FIG. 5 is a depiction of a flowchart showing the logic used to identify linguistic features for a quality model corresponding to a selected document type.

At predefined process 420, the process performs the Identify Linguistic Features for Quality Model of Selected Document Type routine (see FIG. 5 and corresponding text for processing details). This routine gathers the linguistic features from the selected document and trains the system regarding features and corresponding metrics that are particularly relevant to the selected document type. Predefined process 420 stores the identified specific metrics and thresholds in data store 340. At step 430, the process loops through the document types (subtypes) included in the selected document type and retrieved from data store 320 by selecting the first document subtype (e.g. memo, promissory note, appraisal, etc. for financials, etc.) from the selected document type. Predefined process 420 is again performed, this time using the selected document subtype rather than the more general document type to gather the specific metrics and thresholds for such particular subtype. The process determines whether there are more subtypes for the selected document type (decision 450). If there are more sub-types for selected document type, then decision 450 branches to the 'yes' branch which loops back to step 430 to select the next document subtype. This looping continues until all of the subtypes that apply to the document have been processed, at which point decision 450 branches to the 'no' branch exiting the loop.

The process determines as to whether there are more document types to process (decision 460). If there are more document types to process, then decision 460 branches to the 'yes' branch which loops back to step 410 to select and process the next document type as described above. This looping continues until there are no more document types to process, at which point decision 460 branches to the 'no' branch exiting the loop. FIG. 4 processing thereafter returns to the calling routine (see FIG. 3) at 495.

FIG. 5 is a depiction of a flowchart showing the logic used to identify linguistic features for a quality model corresponding to a selected document type. FIG. 5 processing commences at 500 and shows the steps taken by a process that identifies linguistic features for a quality model of a particular document type. At step 510, the process selects the first linguistic feature from data store 520. Examples of linguistic features that can be stored in data store 520 include percentage of valid characters—percentage of valid words—average sentence length, average sentences per paragraph, average words per page, average words per document, average pages per document, language, emotional tone, etc.

At step 525, the process receives input from subject matter expert (SME) 530 of the selected document type/subtype and the SME may add, remove, and/or prioritize the selected linguistic feature based on the pertinence of the feature to the selected document type or subtype. The process determines whether there are more linguistic features to process (decision 550). If there are more linguistic features to process, then decision 550 branches to the 'yes' branch which loops back to step 510 to select and process the next linguistic feature from data store 520. This looping continues until all of the linguistic features have been processed, at which point decision 550 branches to the 'no' branch exiting the loop.

At step 560, the process selects the first exemplary document of selected type or subtype from a set of exemplary documents stored in data store 570. At step 575, the process analyzes the selected document for all of the linguistic features deemed of interest to type/subtype as stored in data store 540 and such features are weighted accordingly (e.g., based on the SME's recommendation, etc.).

At step 580, the process trains the system (e.g., QA system 100, an AI system, a machine learning (ML) system, etc.) using the results from the analysis. The system "learns" the linguistic feature attributes that are found in "good" documents for this type or subtype. In one embodiment, the system being trained (e.g., QA system 100, etc.) uses the training data to set specific metrics and thresholds (stored in data store 340) that are used to assess the quality of documents being ingested. The process determines whether there are more exemplary documents that are being ingested to train the system regarding this document type or subtype (decision 590). If there are more exemplary documents that are being ingested, then decision 590 branches to the 'yes' branch which loops back to step 560 to select and process the next exemplary document as described above. This looping continues until there are no more exemplary documents to process, at which point decision 590 branches to the 'no' branch exiting the loop. FIG. 5 processing thereafter returns to the calling routine (see FIG. 4) at 595.

Figure 6:
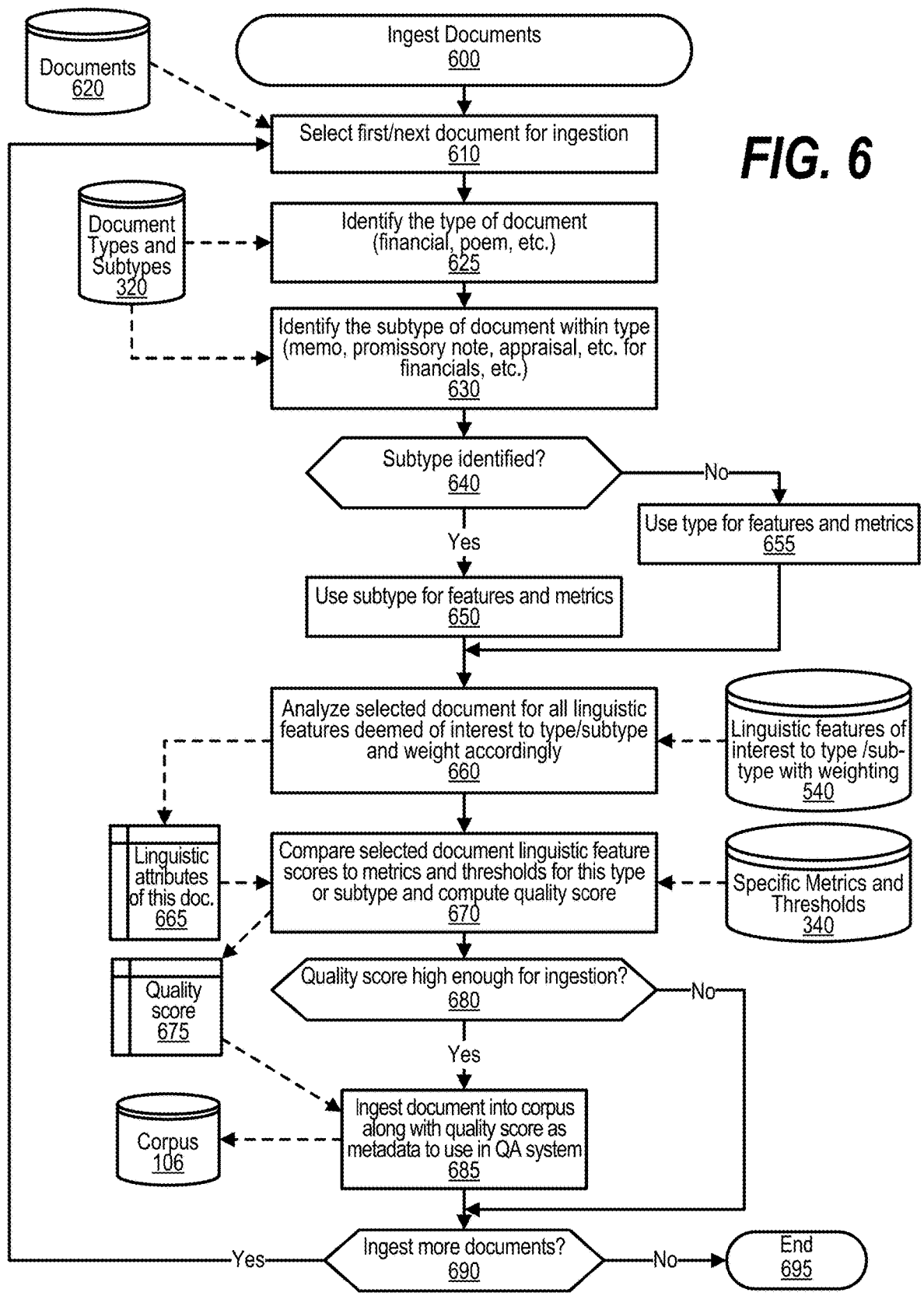
FIG. 6 is a depiction of a flowchart showing the logic used to ingest documents to a corpus utilized by a question-answering (QA) system with the documents being analyzed for linguistic features that are based on the type of document that is being ingested.

FIG. 6 is a depiction of a flowchart showing the logic used to ingest documents to a corpus utilized by a question-answering (QA) system with the documents being analyzed for linguistic features that are based on the type of document that is being ingested. FIG. 6 processing commences at 600 and shows the steps taken by a process that ingests documents into a question-answering (QA) system corpus using a document-type specific quality analysis. At step 610, the process selects the first document for ingestion from a set of documents retrieved from data store 620 (e.g., documents from network sources, etc.). At step 625, the process identifies the type of document that is being ingested (financial, poem, etc.). This identification can be performed automatically or with manual intervention from a user. At step 630, the process identifies the subtype of document within type (memo, promissory note, appraisal, etc. for financials, etc.). This identification can also be performed automatically or with manual intervention from a user. The process determines as to whether a type that is a subtype was identified (decision 640).

If a subtype was identified, then decision 640 branches to the 'yes' branch whereupon, at step 650, the process will utilize the identified subtype for analysis of the document's linguistic features. On the other hand, if a subtype was not identified, then decision 640 branches to the 'no' branch whereupon, at step 655, the process will utilize the identified overall type for analysis of the document's linguistic features.

At step 660, the process analyzes the selected document for all linguistic features deemed of interest to the identified type (general type or subtype) and weighs the features found according to the weights found in the linguistic features data store 540 for this specific document type. The analysis results are stored in memory area 665. At step 670, the process compares the selected document linguistic feature scores found in the selected document to the metrics and thresholds established for this document type (type or subtype) and computes a quality score that is stored in memory area 675.

In one embodiment, the process determines whether the quality score of the document is high enough for ingestion to the corpus (decision 680). If the quality score of the document is high enough for ingestion (e.g., meets a particular quality threshold, etc.), then decision 680 branches to the 'yes' branch whereupon, at step 685, the process ingests the document into corpus 106 along with a quality score as metadata to use by the QA system. On the other hand, if the quality score of the document is not high enough for ingestion, then decision 680 branches to the 'no' branch bypassing step 685.

The process determines as to whether there are more documents in data store 620 for ingestion into the corpus (decision 690). If there are more documents for ingestion into the corpus, then decision 690 branches to the 'yes' branch which loops back to step 610 to select and process the next document from data store 610. This looping continues until all of the documents have been processed, at which point decision 690 branches to the 'no' branch exiting the loop. FIG. 6 processing thereafter ends at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a document and a document type, wherein the document type identifies a document category to which the received document belongs;
   identifying a set of structural linguistic features found in the document, wherein the set of structural linguistic features are associated with the document type;
   retrieving a set of structural linguistic metrics corresponding to the document type;
   comparing the set of structural linguistic features found in the document to the retrieved set of structural linguistic metrics;
   automatically determining a quality of the received document based on the comparing, wherein the determining includes computing a quality score corresponding to the determined quality; and
   in response to the quality score meeting a quality threshold, ingesting the document into a corpus that is utilized by a question-answering (QA) system.

2. The method of claim 1 further comprising:
   ingesting, into the corpus, the quality score as metadata that is associated with the ingested document.

3. The method of claim 1 wherein each of the structural linguistic features are weighted based on an importance of the respective structural linguistic feature to the document type.

4. The method of claim 1 further comprising:
   prior to receiving the document, training a machine learning (ML) system of the document type and the structural linguistic metrics corresponding to the document type, wherein the training comprises:
      inputting a plurality of training document to the ML system, wherein the training documents are known to be high quality documents of the document type;
      extracting the structural linguistic metrics from the plurality of training documents; and
      providing a weighting of the extracted structural linguistic metrics based on an importance of the respective structural linguistic metrics to the document type.

5. The method of claim 1 wherein the document type is selected from a plurality of document types, the plurality of document types comprising a business letter, a poem, an essay, a legal document, a promissory note, a medical record, a scientific article, a newspaper article, a technical article, a thesis paper, a journal article, a blog entry, a financial memo, a resume, a patent application, and a post to a social media site.

6. The method of claim 1 wherein the type of document further includes a document subtype.

7. An information handling system comprising:
   one or more processors;
   a memory coupled to at least one of the processors; and
   a set of computer program instructions stored in the memory and executed by at least one of the processors in order to perform actions comprising:
      receiving a document and a document type, wherein the document type identifies a document category to which the received document belongs;
      identifying a set of structural linguistic features found in the document, wherein the set of structural linguistic features are associated with the document type;
      retrieving a set of structural linguistic metrics corresponding to the document type;
      comparing the set of structural linguistic features found in the document to the retrieved set of structural linguistic metrics;
      automatically determining a quality of the received document, based on the comparing, wherein the determining includes computing a quality score corresponding to the determined quality; and
      in response to the quality score meeting a quality threshold, ingesting the document into a corpus that is utilized by a question-answering (QA) system.

8. The information handling system of claim 7 wherein the actions further comprise:
   ingesting, into the corpus, the quality score as metadata that is associated with the ingested document.

9. The information handling system of claim 7 wherein each of the structural linguistic features are weighted based on an importance of the respective structural linguistic feature to the document type.

10. The information handling system of claim 7 wherein the actions further comprise:
    prior to receiving the document, training a machine learning (ML) system of the document type and the structural linguistic metrics corresponding to the document type, wherein the training comprises:
       inputting a plurality of training document to the ML system, wherein the training documents are known to be high quality documents of the document type;
       extracting the structural linguistic metrics from the plurality of training documents; and
       providing a weighting of the extracted structural linguistic metrics based on an importance of the respective structural linguistic metrics to the document type.

11. The information handling system of claim 7 wherein the document type is selected from a plurality of document types, the plurality of document types comprising a business letter, a poem, an essay, a legal document, a promissory note, a medical record, a scientific article, a newspaper article, a technical article, a thesis paper, a journal article, a blog entry, a financial memo, a resume, a patent application, and a post to a social media site.

12. The information handling system of claim 7 wherein the type of document further includes a document subtype.

13. A computer program product stored in a computer readable storage medium, comprising computer program code that, when executed by an information handling system, performs actions comprising:
- receiving a document and a document type, wherein the document type identifies a document category to which the received document belongs;
- identifying a set of structural linguistic features found in the document, wherein the set of structural linguistic features are associated with the document type;
- retrieving a set of structural linguistic metrics corresponding to the document type;
- comparing the set of structural linguistic features found in the document to the retrieved set of structural linguistic metrics;
- automatically determining a quality of the received document based on the comparing, wherein the determining includes computing a quality score corresponding to the determined quality; and
- in response to the quality score meeting a quality threshold, ingesting the document into a corpus that is utilized by a question-answering (QA) system, wherein the ingesting is based on the determined quality.

14. The computer program product of claim 13 wherein the actions further comprise:
- ingesting, into the corpus, the quality score as metadata that is associated with the ingested document.

15. The computer program product of claim 13 wherein each of the structural linguistic features are weighted based on an importance of the respective structural linguistic feature to the document type.

16. The computer program product of claim 13 wherein the actions further comprise:
- prior to receiving the document, training a machine learning (ML) system of the document type and the structural linguistic metrics corresponding to the document type, wherein the training comprises:
  - inputting a plurality of training document to the ML system, wherein the training documents are known to be high quality documents of the document type;
  - extracting the structural linguistic metrics from the plurality of training documents; and
  - providing a weighting of the extracted structural linguistic metrics based on an importance of the respective structural linguistic metrics to the document type.

17. The computer program product of claim 13 wherein the document type is selected from a plurality of document types, the plurality of document types comprising a business letter, a poem, an essay, a legal document, a promissory note, a medical record, a scientific article, a newspaper article, a technical article, a thesis paper, a journal article, a blog entry, a financial memo, a resume, a patent application, and a post to a social media site.

* * * * *